United States Patent
Fay, II

(10) Patent No.: US 9,603,306 B2
(45) Date of Patent: Mar. 28, 2017

(54) AGRICULTURAL MACHINE WITH RETAINING ELEMENTS FOR RETAINING A HEADER IN AN ELEVATED POSITION

(71) Applicant: CNH Industrial America LLC, New Holland, PA (US)

(72) Inventor: Jeffrey B. Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/326,914

(22) Filed: Jul. 9, 2014

(65) Prior Publication Data
US 2016/0007534 A1 Jan. 14, 2016

(51) Int. Cl.
 *A01B 49/00* (2006.01)
 *A01D 75/00* (2006.01)
 *A01B 73/00* (2006.01)

(52) U.S. Cl.
 CPC .......... *A01D 75/004* (2013.01); *A01B 73/005* (2013.01)

(58) Field of Classification Search
 CPC ....... A01B 73/005; A01B 73/00; A01B 51/04; A01B 59/042; A01B 73/046; A01B 73/065; A01B 63/002; A01B 71/06; A01D 67/005; A01D 75/002; A01D 75/004; Y10S 56/09; Y10S 56/14
 USPC ........ 172/311, 625, 466, 386; 280/462, 463, 280/409; 56/228
 See application file for complete search history.

(56) References Cited

U.S. PATENT DOCUMENTS

| 1,421,439 | A |   | 7/1922 | Finckh |           |
|-----------|---|---|--------|--------|-----------|
| 2,109,098 | A |   | 2/1938 | Baxter |           |
| 2,148,311 | A | * | 2/1939 | Vutz   | A01D 67/005 |
|           |   |   |        |        | 280/452 |
| 2,286,305 | A |   | 6/1942 | Priestley |       |
| 2,540,228 | A |   | 2/1951 | Adkisson |       |
| 2,833,105 | A | * | 5/1958 | Naery  | A01B 73/005 |
|           |   |   |        |        | 56/15.6 |

(Continued)

FOREIGN PATENT DOCUMENTS

| DE | 4309498 | 9/1994 |
| DE | 20113820 | 12/2001 |

(Continued)

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, Specification, 45 pp.

(Continued)

*Primary Examiner* — Arpád Fábián-Kovács
(74) *Attorney, Agent, or Firm* — Peter K. Zacharias; Patrick M. Sheldrake

(57) ABSTRACT

A transport arrangement for an agricultural machine having a suspension system. The transport arrangement includes a header unit a tongue arrangement and a retaining system. The header unit is carried by the suspension system. The tongue arrangement is coupled to the suspension system, and is pivotal about an axis relative to the header unit and the suspension system. The retaining system is configured to releasably couple the tongue arrangement to the header unit and/or the suspension system to thereby retain the header unit in an elevated position.

19 Claims, 9 Drawing Sheets

(56) References Cited

U.S. PATENT DOCUMENTS

| | | | |
|---|---|---|---|
| 2,911,780 A | 11/1959 | Brady | |
| 2,938,588 A | 5/1960 | Stein | |
| 2,963,303 A * | 12/1960 | Young | A01D 67/005 172/317 |
| 3,241,300 A | 3/1966 | Fell et al. | |
| 3,245,695 A | 4/1966 | Bernard | |
| 3,288,480 A | 11/1966 | Calkins et al. | |
| 3,408,956 A | 11/1968 | Rebenok et al. | |
| 3,515,408 A * | 6/1970 | Cagle | B62D 53/062 172/240 |
| 3,523,410 A | 8/1970 | Taylor et al. | |
| 3,577,713 A * | 5/1971 | McCarty | A01D 43/107 172/466 |
| 3,590,928 A | 7/1971 | Mirus | |
| 3,648,780 A | 3/1972 | Fueslein et al. | |
| 3,683,602 A | 8/1972 | Scarnato et al. | |
| 3,721,073 A | 3/1973 | Scarnato et al. | |
| 3,786,764 A | 1/1974 | Beers, Jr. et al. | |
| 3,814,191 A * | 6/1974 | Tilbury | A01B 73/044 172/311 |
| 3,841,070 A | 10/1974 | Scarnato et al. | |
| 3,881,301 A | 5/1975 | Sawyer et al. | |
| 3,897,832 A | 8/1975 | Leedahl et al. | |
| 3,911,649 A | 10/1975 | Scarnato et al. | |
| 3,919,831 A | 11/1975 | Halls et al. | |
| 3,955,627 A * | 5/1976 | Brown | A01B 69/024 172/130 |
| 4,026,365 A | 5/1977 | Andersson et al. | |
| 4,043,403 A | 8/1977 | Anderson et al. | |
| 4,099,364 A | 7/1978 | Kanengieter et al. | |
| 4,106,788 A | 8/1978 | Bohnert | |
| 4,106,813 A | 8/1978 | Goodbary | |
| 4,119,329 A | 10/1978 | Smith | |
| 4,162,085 A | 7/1979 | Miranowski | |
| 4,180,135 A | 12/1979 | Birkenbach et al. | |
| 4,222,334 A | 9/1980 | Peterson | |
| 4,283,071 A | 8/1981 | Pedersen | |
| 4,316,511 A * | 2/1982 | Andersen | A01B 73/044 172/456 |
| 4,361,341 A * | 11/1982 | Gustafson | B60D 1/00 172/248 |
| 4,381,118 A * | 4/1983 | Weeks | A01B 73/00 172/311 |
| 4,418,516 A * | 12/1983 | Donovan | A01B 73/00 172/679 |
| 4,418,517 A * | 12/1983 | Ehrhart | A01D 67/005 172/679 |
| 4,418,518 A * | 12/1983 | Koch | A01D 67/005 172/679 |
| 4,435,948 A | 3/1984 | Jennings | |
| 4,442,662 A | 4/1984 | Jennings | |
| 4,455,034 A | 6/1984 | de Graff et al. | |
| 4,460,193 A | 7/1984 | Dietz et al. | |
| 4,506,904 A * | 3/1985 | Kinzenbaw | A01B 73/005 172/248 |
| 4,512,416 A | 4/1985 | Smith | |
| 4,526,235 A | 7/1985 | Kinzenbaw | |
| 4,534,416 A | 8/1985 | Johnson | |
| 4,558,560 A * | 12/1985 | Koch | A01B 73/005 56/192 |
| 4,573,309 A * | 3/1986 | Patterson | A01D 80/005 172/248 |
| 4,607,996 A | 8/1986 | Koch | |
| 4,660,654 A * | 4/1987 | Wiebe | A01B 73/044 172/311 |
| 4,662,646 A | 5/1987 | Schlapman et al. | |
| 4,682,462 A | 7/1987 | Johnson, Sr. | |
| 4,765,639 A | 8/1988 | Murray | |
| 4,831,814 A | 5/1989 | Frisk et al. | |
| 4,867,245 A | 9/1989 | Stevens | |
| 4,871,028 A | 10/1989 | Murray | |
| 4,905,466 A | 3/1990 | Heppner | |
| 4,934,131 A * | 6/1990 | Frisk | A01B 73/005 56/15.5 |
| 4,986,064 A * | 1/1991 | Ermacora | A01B 73/005 280/415.1 |
| 4,991,383 A | 2/1991 | Ermarcora | |
| 5,000,268 A | 3/1991 | Zimmerman | |
| 5,024,279 A | 6/1991 | Warner et al. | |
| 5,025,616 A * | 6/1991 | Moss | A01B 51/00 111/57 |
| 5,113,956 A * | 5/1992 | Friesen | A01B 73/065 172/311 |
| 5,136,828 A * | 8/1992 | Ermacora | A01B 63/00 280/43.23 |
| 5,199,250 A * | 4/1993 | Ermacora | A01B 73/005 56/15.2 |
| 5,243,810 A | 9/1993 | Fox et al. | |
| 5,261,497 A * | 11/1993 | Snyder | A01B 59/04 172/284 |
| 5,274,990 A * | 1/1994 | Aron | A01B 73/046 56/370 |
| 5,429,195 A | 7/1995 | Turnis | |
| 5,566,536 A * | 10/1996 | Krafka | A01D 43/107 56/15.2 |
| 5,642,607 A | 7/1997 | Stephenson et al. | |
| 5,778,647 A | 7/1998 | McLean et al. | |
| 5,839,516 A * | 11/1998 | Arnold | A01B 73/065 172/311 |
| 5,901,533 A | 5/1999 | Ermacora et al. | |
| 5,930,988 A | 8/1999 | Hanson | |
| 5,943,848 A | 8/1999 | Rice et al. | |
| 6,152,240 A | 11/2000 | Nonhoff et al. | |
| 6,189,306 B1 | 2/2001 | Walch | |
| 6,209,297 B1 * | 4/2001 | Yeomans | A01B 73/005 56/14.9 |
| 6,213,219 B1 | 4/2001 | Mosdal et al. | |
| 6,238,170 B1 * | 5/2001 | Pingry | A01B 51/04 172/311 |
| 6,260,629 B1 | 7/2001 | Toth | |
| 6,273,449 B1 * | 8/2001 | Harkcom | A01B 73/005 280/463 |
| 6,321,852 B1 | 11/2001 | Pratt | |
| 6,336,313 B1 | 1/2002 | Bonnewitz | |
| 6,360,516 B1 | 3/2002 | Harkcom et al. | |
| 6,408,950 B1 * | 6/2002 | Shoup | A01B 73/065 111/57 |
| 6,421,994 B1 | 7/2002 | Boucher et al. | |
| 6,485,246 B1 * | 11/2002 | Harkcom | A01B 73/005 410/3 |
| 6,546,708 B2 * | 4/2003 | Faivre | A01B 59/042 56/15.2 |
| 6,606,956 B1 * | 8/2003 | Paluch | A01B 61/044 111/200 |
| 6,702,035 B1 * | 3/2004 | Friesen | A01B 73/065 172/311 |
| 6,739,612 B2 | 5/2004 | Colistro | |
| 6,854,251 B2 | 2/2005 | Snider | |
| 6,907,719 B2 | 6/2005 | Ligouy | |
| 7,047,714 B1 * | 5/2006 | Stephenson | A01D 75/004 56/15.2 |
| 7,100,350 B2 | 9/2006 | Breneur | |
| 7,197,865 B1 | 4/2007 | Enns et al. | |
| 7,347,277 B2 | 3/2008 | Enns et al. | |
| 7,552,579 B2 | 6/2009 | Tippery et al. | |
| 7,712,544 B1 * | 5/2010 | Misenhelder | A01B 73/065 172/311 |
| 7,849,933 B2 * | 12/2010 | Marggi | A01B 73/067 172/311 |
| 7,926,249 B1 * | 4/2011 | Cook | A01B 73/005 172/240 |
| 8,112,977 B2 | 2/2012 | Priepke | |
| 8,141,652 B2 * | 3/2012 | Poole | A01B 73/065 172/311 |
| 8,209,946 B2 | 7/2012 | Neudorf et al. | |
| 8,292,328 B2 | 10/2012 | Honas et al. | |
| 8,464,508 B2 | 6/2013 | Matousek et al. | |
| 9,179,591 B2 | 11/2015 | Barnett et al. | |
| 9,179,592 B2 | 11/2015 | Snider et al. | |

(56) References Cited

U.S. PATENT DOCUMENTS

| | | | |
|---|---|---|---|
| 9,185,837 B2 | 11/2015 | Barnett et al. | |
| 9,185,838 B2 | 11/2015 | Chan et al. | |
| 9,185,839 B2 | 11/2015 | Kolegaev et al. | |
| 2002/0005629 A1* | 1/2002 | Rosenboom | A01B 51/04 280/651 |
| 2004/0011538 A1* | 1/2004 | Raducha | A01B 73/005 172/311 |
| 2006/0123764 A1 | 6/2006 | McLean et al. | |
| 2011/0197561 A1 | 8/2011 | Priepke | |
| 2011/0272917 A1 | 11/2011 | Hilsabeck et al. | |
| 2012/0132768 A1 | 5/2012 | Lammerant et al. | |
| 2013/0284467 A1 | 10/2013 | Snider et al. | |
| 2013/0284468 A1 | 10/2013 | Barnett et al. | |
| 2013/0284469 A1* | 10/2013 | Barnett | A01B 63/22 172/452 |
| 2014/0053522 A1 | 2/2014 | Kolegaev et al. | |
| 2014/0083071 A1 | 3/2014 | Fay, II | |
| 2014/0096498 A1 | 4/2014 | Estock et al. | |
| 2014/0196429 A1 | 7/2014 | Gantzer | |
| 2015/0282426 A1 | 10/2015 | Gantzer et al. | |
| 2016/0007534 A1 | 1/2016 | Fay, II | |

FOREIGN PATENT DOCUMENTS

| | | |
|---|---|---|
| EP | 350513 | 1/1990 |
| EP | 628237 | 12/1994 |
| EP | 764396 | 3/1997 |
| EP | 0 818 134 A2 | 1/1998 |
| EP | 823985 | 2/1998 |
| EP | 1769668 | 4/2007 |
| FR | 2332690 | 6/1977 |
| FR | 2712137 | 5/1995 |
| FR | 2752356 | 2/1998 |
| GB | 2194872 | 3/1988 |
| GB | 2232055 A | 12/1990 |
| GB | 2490342 | 10/2012 |
| GB | 2504093 | 1/2014 |
| WO | WO2013135676 | 9/2013 |

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, Drawings, 16 pp.

EP Application No. 15175673, European Search Report, dated Nov. 27, 2015, 6 pp.

* cited by examiner

AGRICULTURAL MACHINE WITH RETAINING ELEMENTS FOR RETAINING A HEADER IN AN ELEVATED POSITION

BACKGROUND

1. Field of the Invention

The subject disclosure relates to transport arrangements for agricultural machines, and, more particularly, relates to an arrangement for the machine, such as an agricultural mower, to enable the machine to be transitioned to a transport mode such that the header is retained in an elevated position.

2. Description of the Related Art

Agricultural mowers and mower/conditioners, hereinafter referred to simply as mowers, are well known and include self-propelled and pull-behind types. A problem with pull-behind mowers involves the transporting of the machines between fields, since the width of the machine may exceed practical or regulatory limits. Machine movement may be necessary over farm lanes, through gates or on highways where the machine width will not allow passage in the operating orientation.

A typically solution is to place the mower-conditioner header mechanism on a separate trailer such that the lateral width of the mechanism is generally aligned with the length of the trailer (lateral transport) and then tow the trailer with the tractor. One such example is the Discbine™ Transporter (by common assignee) which is specifically configured for loading, unloading, and laterally transporting a Model 1441/1442 disc mower conditioner while attached to the operating power unit (tractor). Such special trailers add significant cost, requires significant skill to load and unload, and must be used to transport the machine between locations or separately transported.

It would be advantageous to provide a reconfigurable transport arrangement for supporting a pull-behind mower header to be laterally transported while attached to a tractor and retaining the header of the mower in an elevated position without requiring an additional implement or special trailer. Further advantages would be realized by a lateral transport system that is quickly and easily transitioned to a passively retained header in an elevated position in the lateral transport configuration. Still further advantages would be realized by a lateral transport system that can be produced with less cost than the separate trailer lateral transport option it replaces.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

The subject disclosure provides a transport arrangement for supporting a mower allowing lateral transportation of the mower, with the header of the mower passively retained while attached to a tractor without requiring an additional implement or special trailer.

The disclosure in one form is directed to a transport arrangement for an agricultural machine having a suspension system. The transport arrangement includes a header unit a tongue arrangement and a retaining system. The header unit is carried by the suspension system. The tongue arrangement is coupled to the suspension system, and is pivotal about an axis relative to the header unit and the suspension system. The retaining system is configured to releasably couple the tongue arrangement to the header unit and/or the suspension system to thereby retain the header unit in an elevated position.

The disclosure in another form is directed to an agricultural mower including a chassis, a header unit carried by the chassis, a tongue arrangement and a retaining system. The tongue arrangement is coupled to the chassis. The tongue arrangement is pivotal about an axis relative to the header unit and the chassis. The retaining system is configured to releasably couple the tongue arrangement to the header unit and/or the chassis to thereby retain the header unit in an elevated position.

An advantage of the subject disclosure is that the lateral transport mode is accomplished without a separate implement or trailer.

Another advantage is that the transport mode is achieved using hydraulic controls available on the tractor and the header is passively retained in an elevated position.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

BRIEF DESCRIPTION OF THE DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein.

Corresponding reference characters indicate corresponding parts throughout the several views. The exemplification set out herein illustrates an embodiment of the subject disclosure, and such exemplification is not to be construed as limiting the scope of the subject disclosure in any manner.

DETAILED DESCRIPTION

Figure 1:
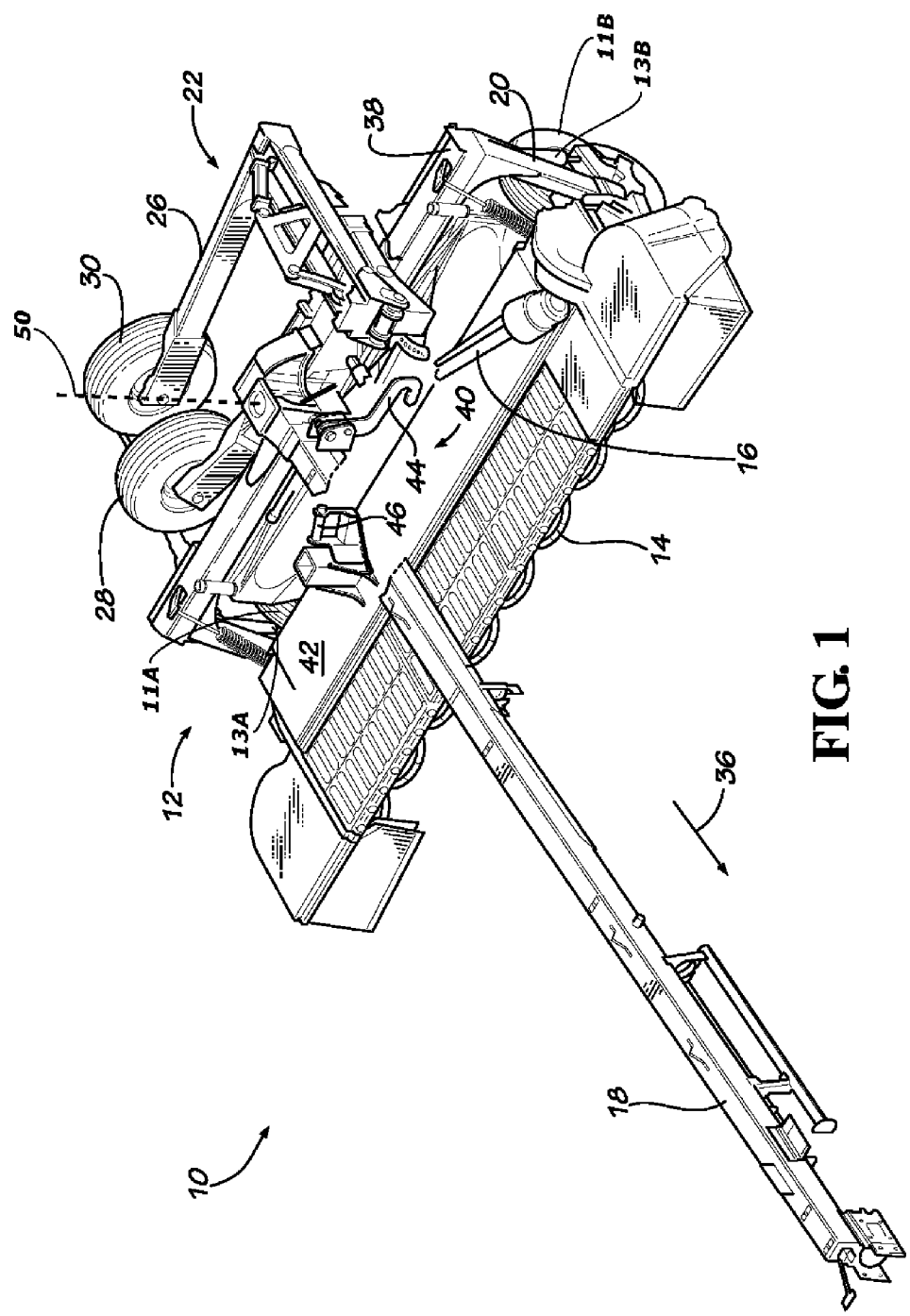
FIG. 1 is a perspective view of an agricultural machine in the form of a mower including a transport arrangement in the stowed position with part of the structure cut away to illustrate an embodiment of a retaining system of the present application.

Referring now to the drawings, and more particularly to FIG. 1, there is shown a perspective view of an agricultural machine in the form of a mower 10, which can be attached to a tractor (not shown). Mower 10 generally includes a pair of wheels 11A and 11B and a chassis 12, which carries a number of other components such as crop engaging blades 14, and drive components 16. A tongue 18 is pivotally connected to chassis 12, an end of which can be connected to the tractor. A field suspension system 20 supports mower 10 while mower 10 is in a field mode. Mower 10 additionally includes a transport arrangement 22, which, when deployed, provides the support for the transport of mower 10. Crop engaging blades 14 can be disc cutter blades 14 or a sickle bar, or another crop cutting device. Mower 10 additionally includes a retaining system 40 for the passive coupling of a header 42 to tongue 18. Retaining system 40 includes a hook 44, e.g., a first retaining element, and a retaining pin 46, e.g., a second retaining element.

Now, additionally referring to FIGS. 2-8, transport arrangement 22 includes suspension elements 24 and 26, which respectively have wheels 28 and 30 connected to corresponding ends of suspension elements 24 and 26. Suspension elements 24 and 26 are rotatable about an axis 32, when suspension element 26 is in the position shown in FIGS. 4-8. Additionally, suspension element 26 is rotatable about an axis 34 as it transitions from a stowed position illustrated in FIGS. 1-3 to the position shown in FIG. 4. Axis 32 is generally perpendicular to axis 34.

When suspension element 26 is in the stowed position it is generally above, or at least vertically elevated above, suspension element 24. Additionally, suspension element 26 is somewhat shorter than suspension element 24, as can be particularly seen in FIG. 2, where it can also be seen that suspension element 26 is positioned such that wheel 30 is behind wheel 28 when transport arrangement 22 is in a stowed position.

Figure 2:
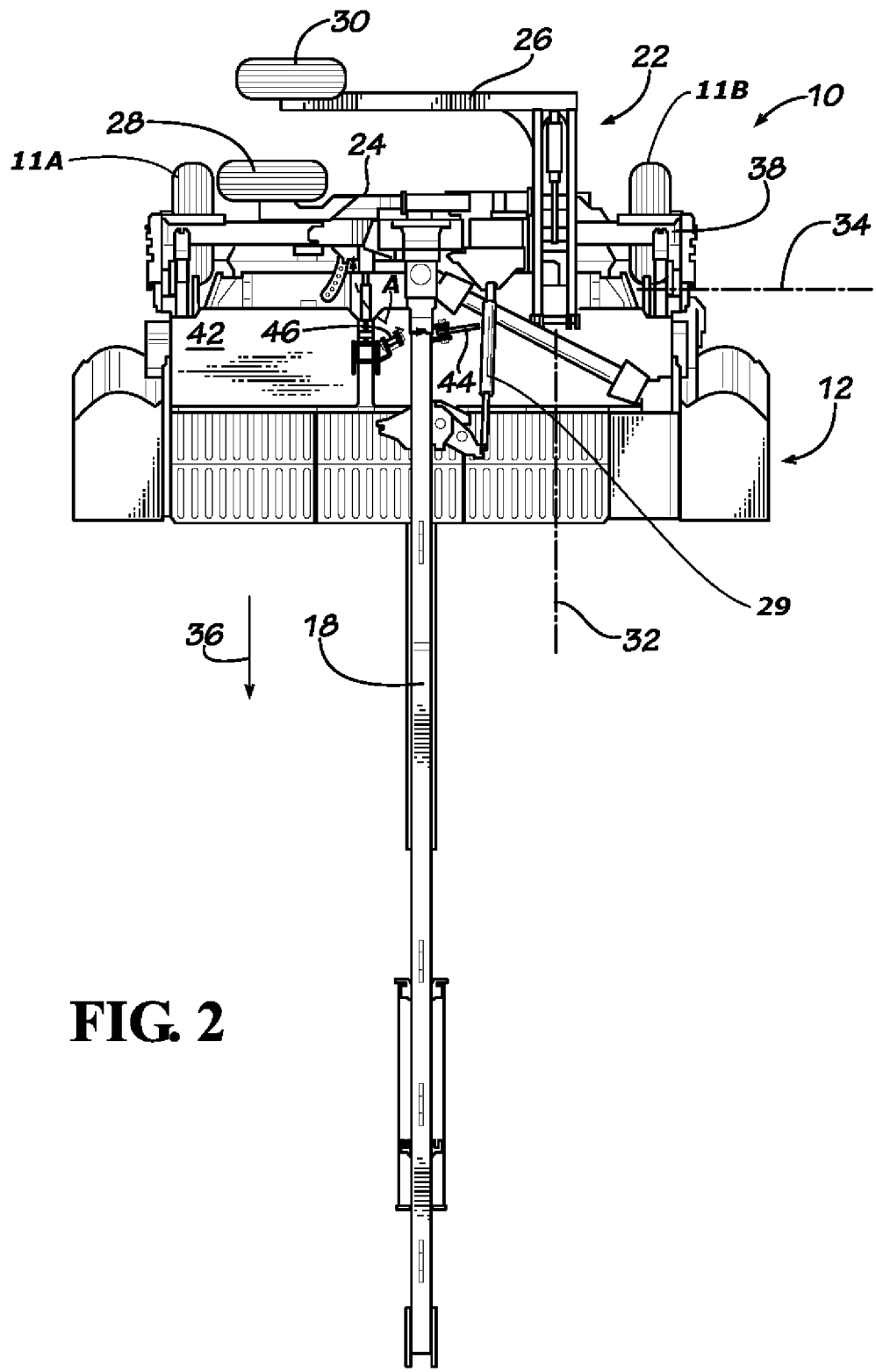
FIG. 2 is a top view of the mower with the retaining system shown in FIG. 1.
Figure 3:
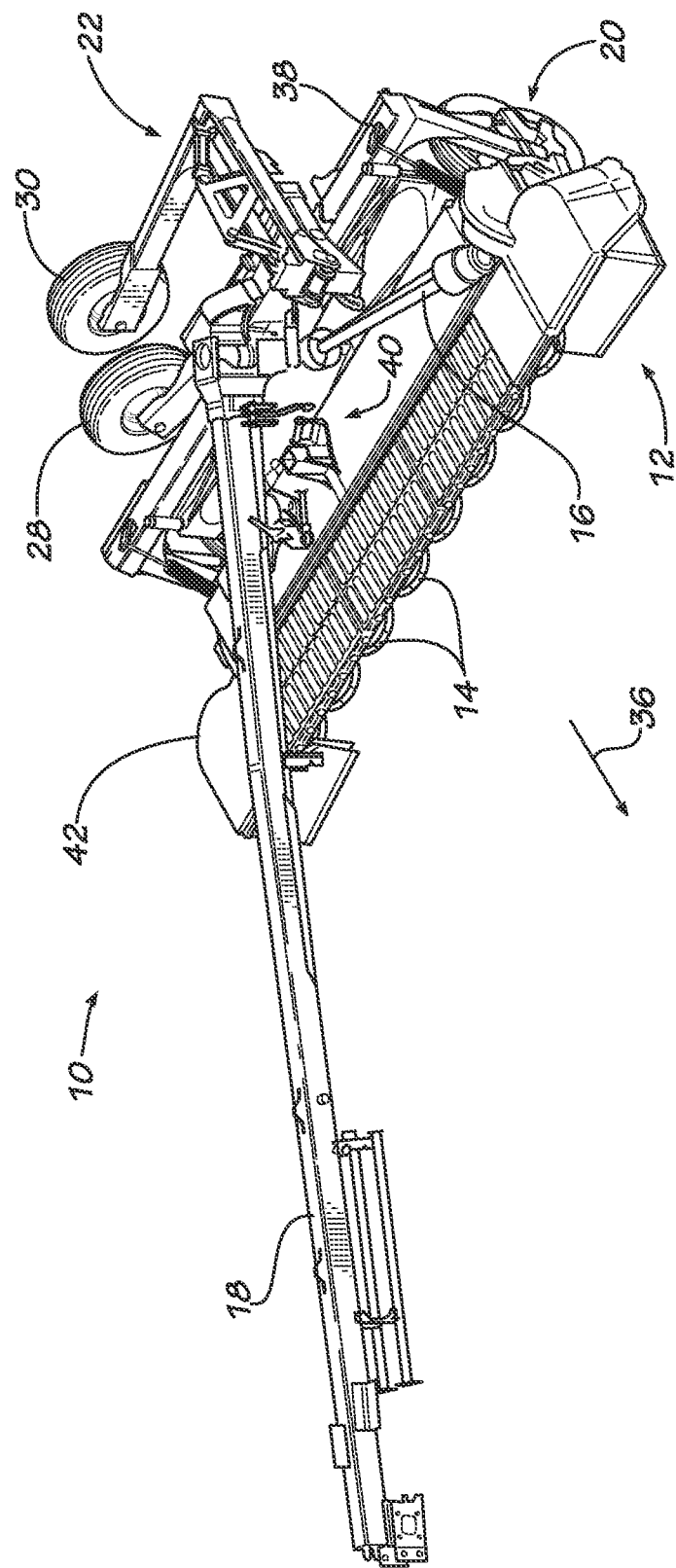
FIG. 3 is a perspective view of the mower shown in FIGS. 1 and 2, with the tongue shifted to a field use position.

A sequence of movements of the elements of mower 10 will now be discussed with references to the various figures. FIGS. 1 and 2 illustrate transport arrangement 22 in a stowed position and tongue 18 is angularly positioned in a substantially forward direction 36. This is a configuration in which mower 10 can be used, but generally mower 10 will be used with tongue 18 located to either side, such as that shown in FIG. 3. FIG. 3 illustrates a predetermined position for tongue 18 to be located to allow the needed clearance for suspension element 26 to be rotated about axis 34 by a primary lateral transport cylinder 25, as shown fully deployed, in FIG. 4. Initially the field wheels 11A and 11B associated with field suspension system 20 are fully extended by lift cylinders 13A and 13B, respectively, to lift chassis 12.

Figure 4:
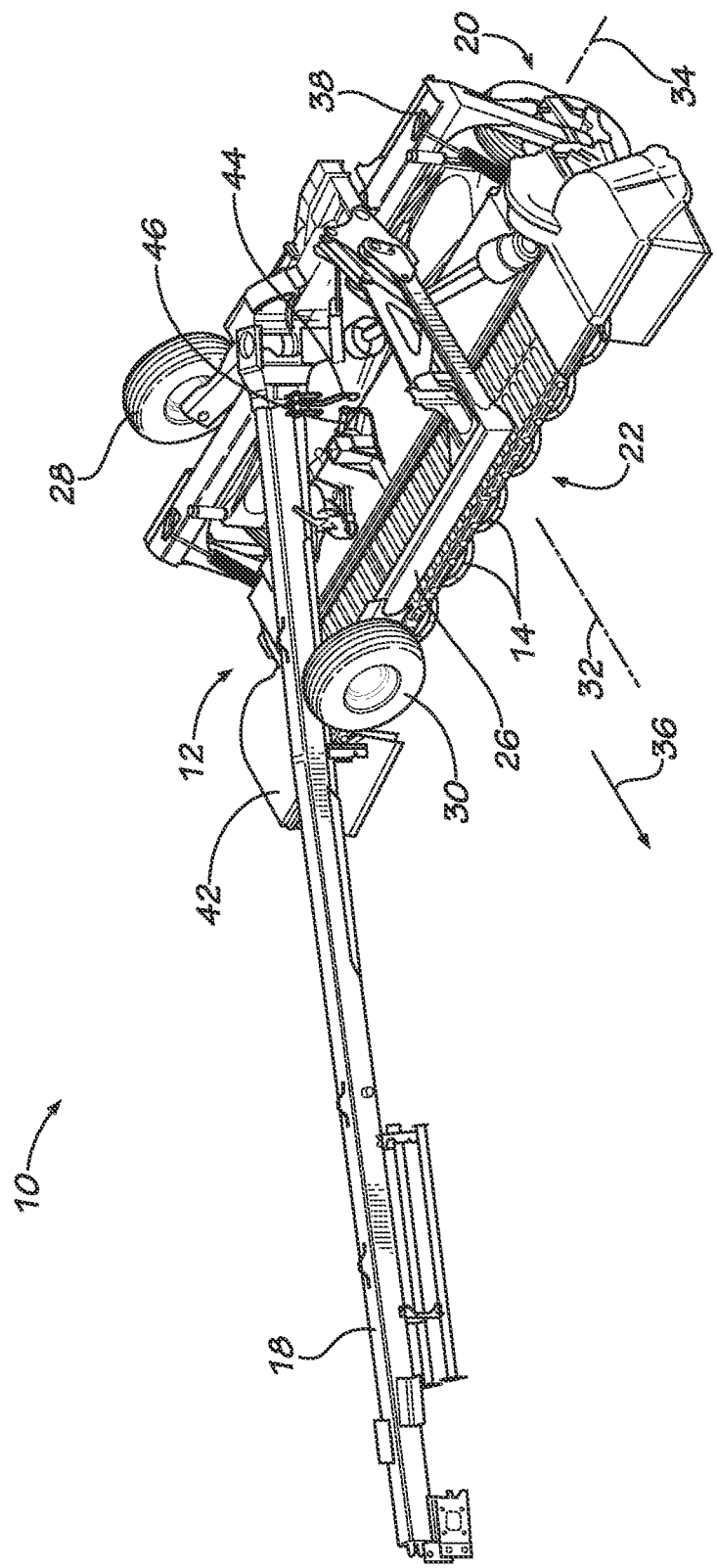
FIG. 4 is another perspective view of the mower of FIGS. 1-3, illustrating the transport arrangement of the present application being deployed.
Figure 5:
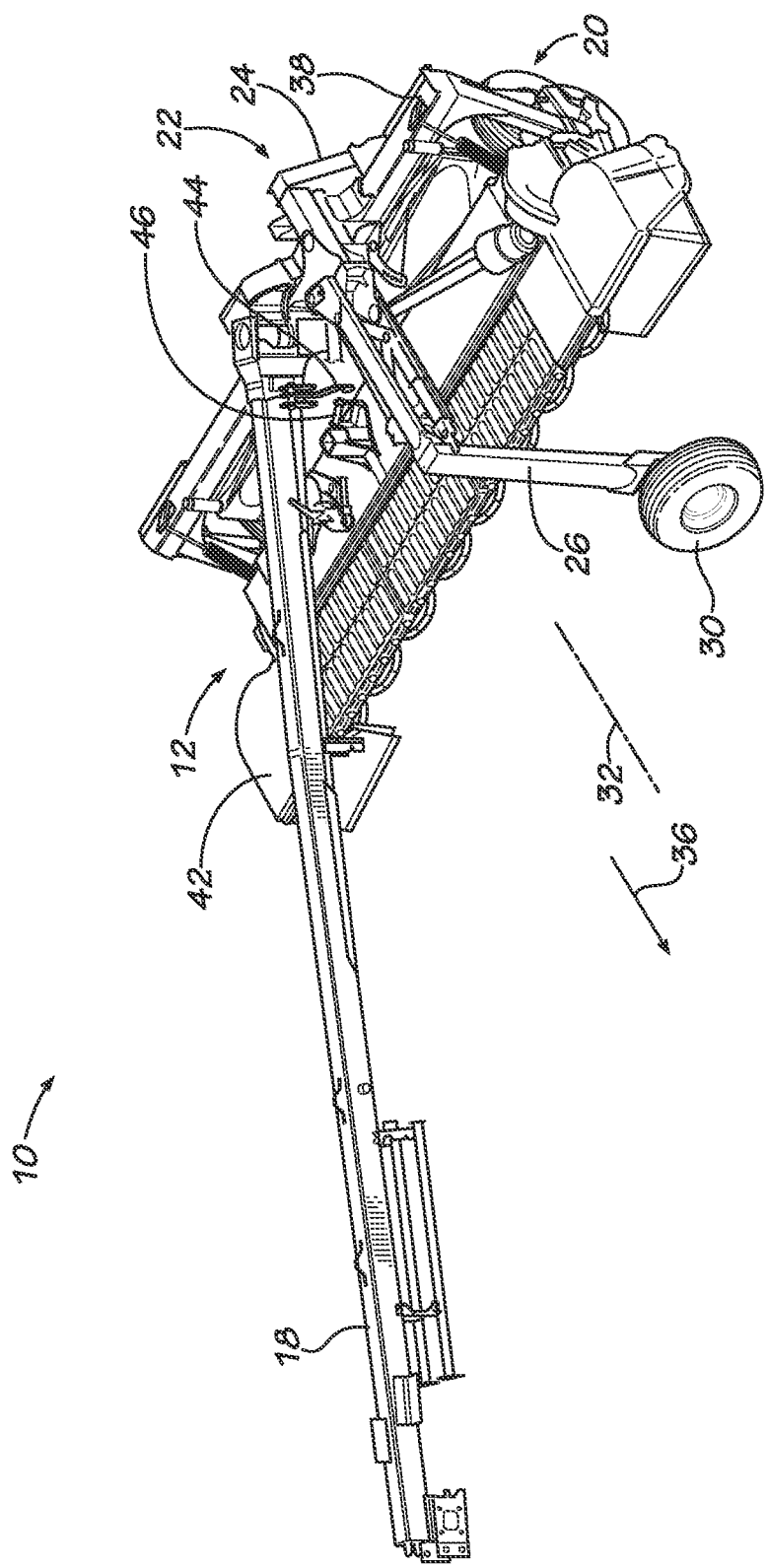
FIG. 5 is yet another perspective view of the mower of FIGS. 1-4, illustrating the transport arrangement of the present application being further deployed lifting the chassis of the mower.

Once transport arrangement 22 is positioned as shown in FIG. 4, then both suspension elements 24 and 26 are rotated about axis 32 by a secondary lateral transport cylinder 27 causing wheels 28 and 30 to contact the ground thereby lifting chassis 12 so that field suspension system 20 is lifted off of the ground. Field suspension system 20 can be coordinated to also lift its wheels 11A and 11B while or after wheels 28 and 30 contact the ground but after header 42 is secured in a raised position. A result of this step is that transport arrangement 22 is fully deployed as seen in FIG. 5 and is in the transport position, except for the position of tongue 18. In FIGS. 1-5, retaining system 40 is not engaged and header 42 is completely under the control of actuators 13A, 13B that position header 42 as suspension system 20 is deployed or retracted.

Figure 6:
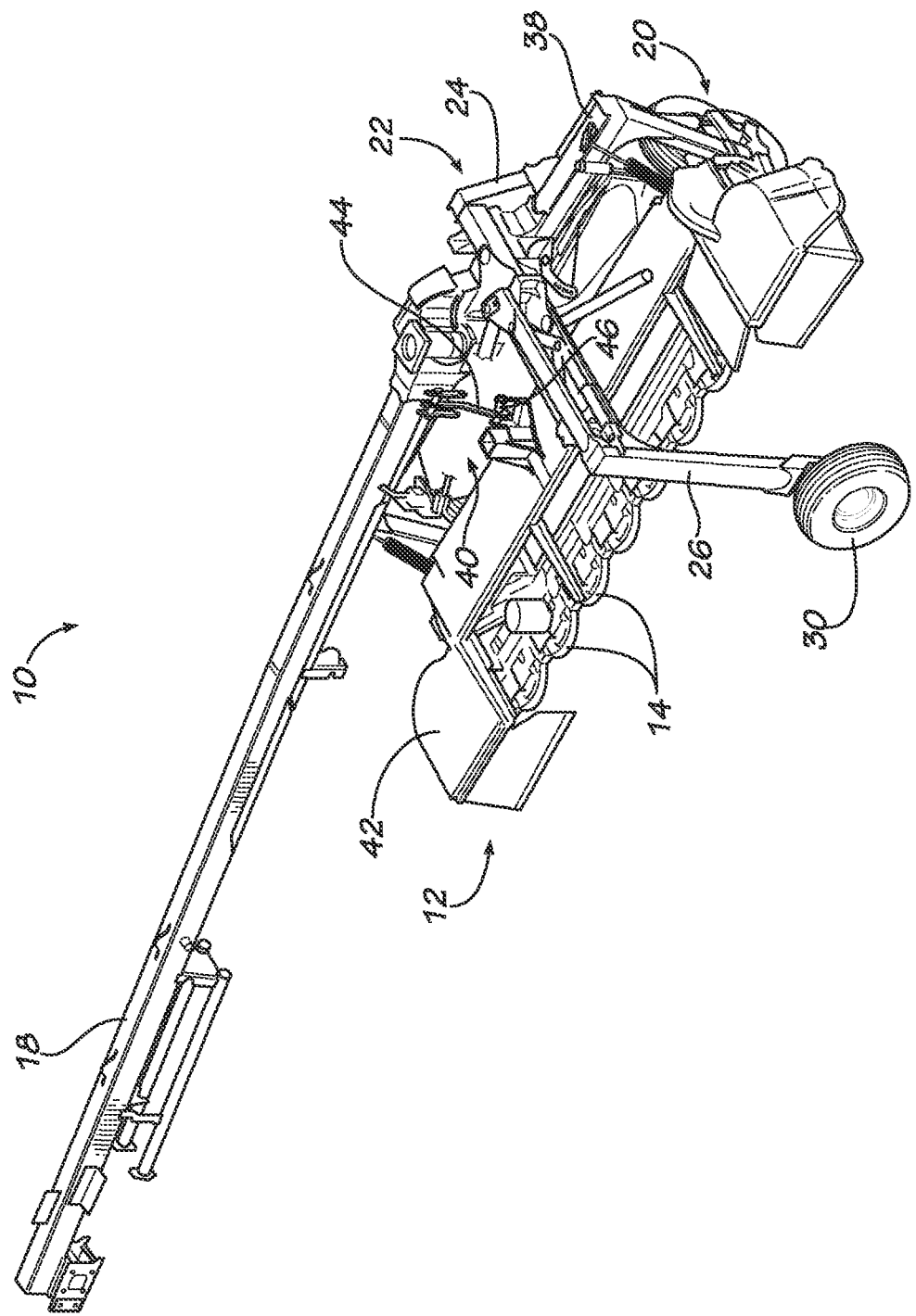
FIG. 6 is yet another perspective view of the mower of FIGS. 1-5, illustrating the tongue of the mower being pivoted to a transport position and the retaining system being engaged.
Figure 7:
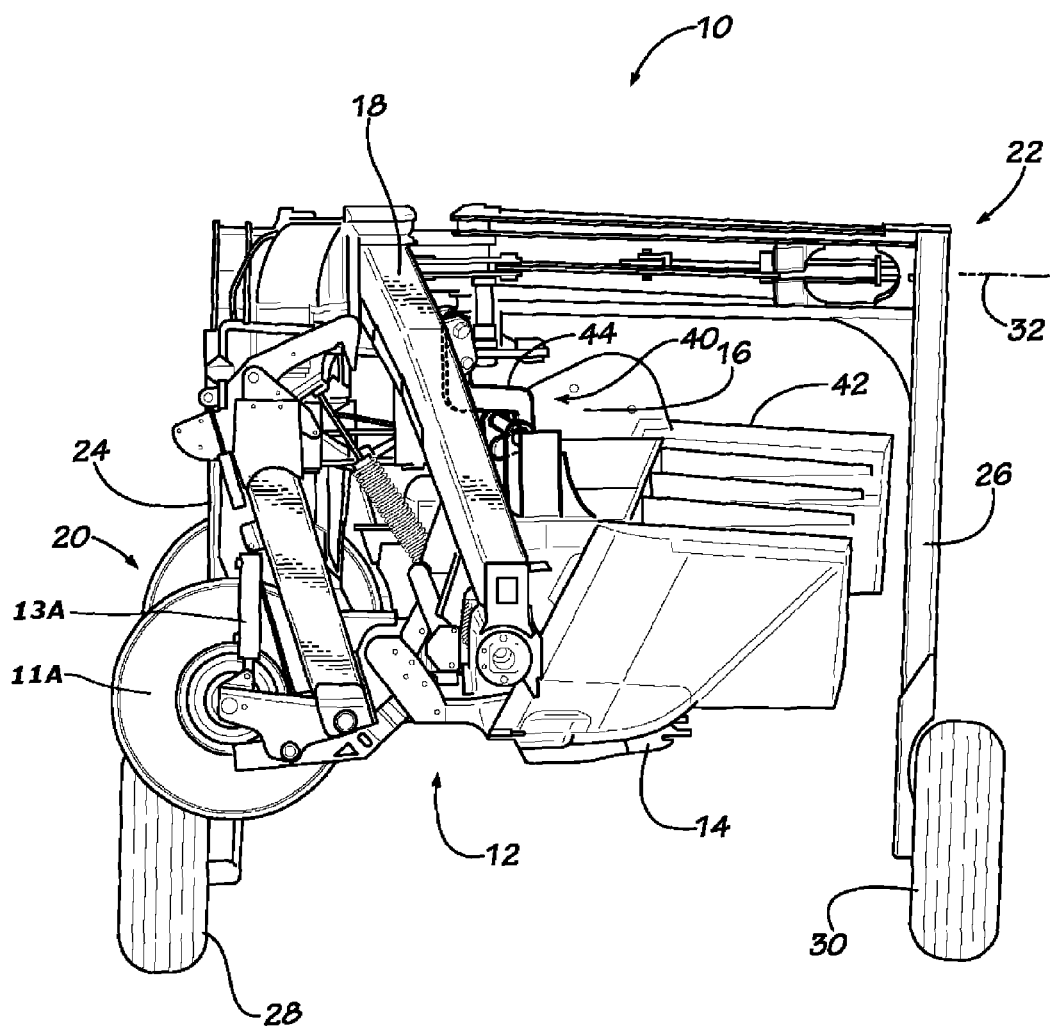
FIG. 7 is a front view of the mower of FIGS. 1-6, illustrating the transport arrangement of the present application being deployed for transporting the mower, from the perspective of the operator in a tractor.
Figure 8:
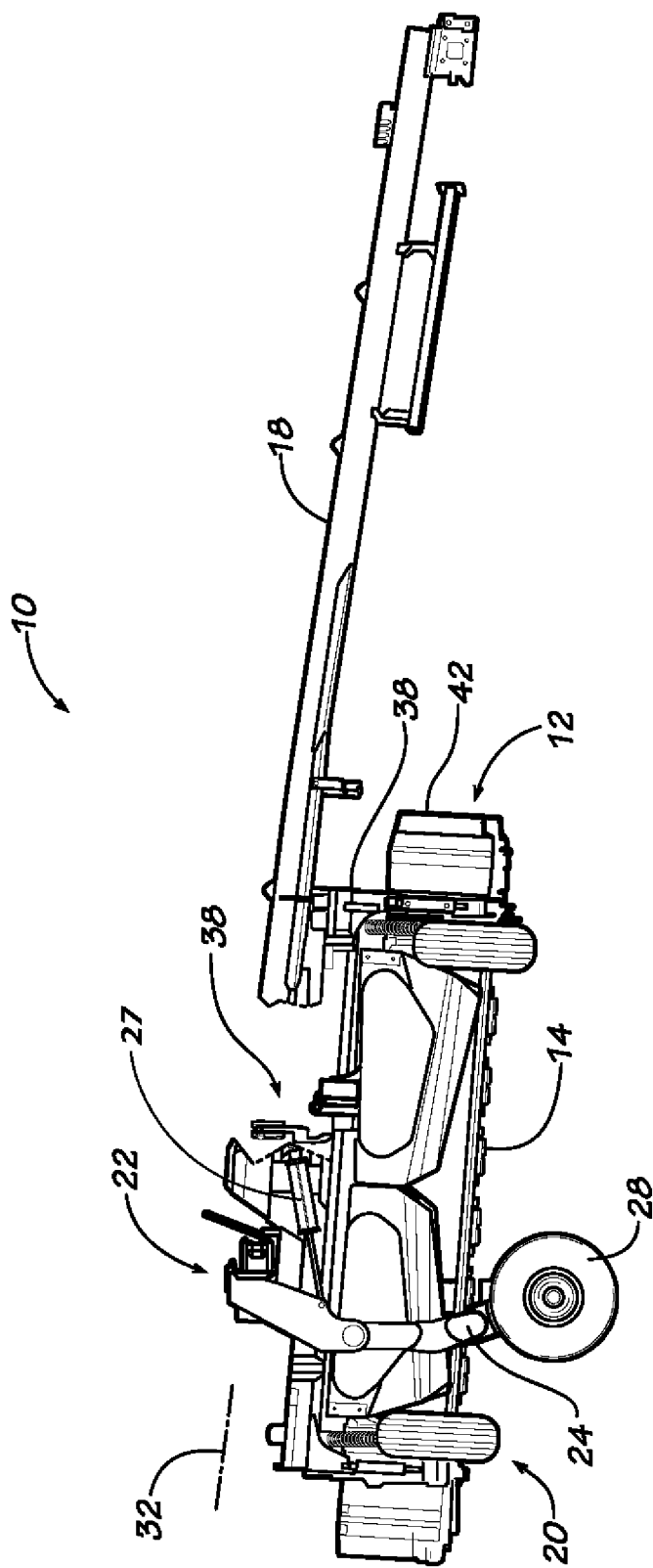
FIG. 8 is a side view of the mower of FIGS. 1-7, illustrating the transport arrangement of the present application being fully deployed having lifted the header of the mower and engaged the retaining system.
Figure 9:
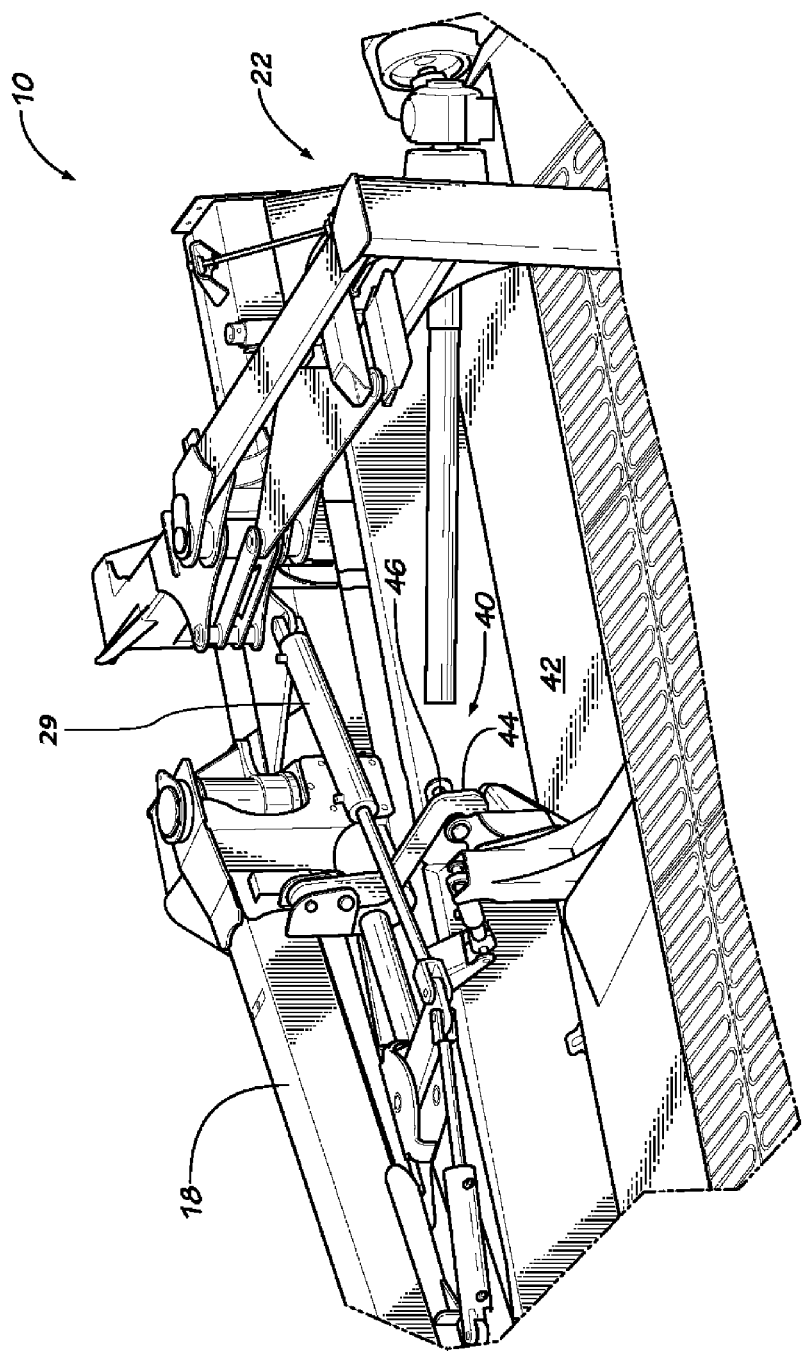
FIG. 9 is a partial view of the transport arrangement of FIGS. 1-8 showing details of the retaining system.

The next step is that tongue 18 is now swung by a cylinder 29 to a transport position as shown in FIG. 6 about an axis 50 (shown in FIG. 1). This step has to wait on the full deployment of transport arrangement 22 to prevent mower 10 from tipping to one side. As tongue 18 is completely moved to the position shown in FIG. 6, hook 44 is moved along a circular path A (illustrated in FIG. 2) until it engages retaining pin 46 thereby securing header 42 in the raised position. With header 42 secured in a raised position if actuators 13A, 13B that are used to raise header 42 are retracted, or simply slowly relax, retaining system 40 holds header 42 in the raised position as shown in FIGS. 6-9. The wheels 11A and 11B of field suspension system 20 are raised to provide ground clearance by the retraction of the lift cylinders 13A and 13B associated with field suspension system 20 (as can be seen in FIGS. 7 and 8). FIGS. 7 and 8 show mower 10 in the transport mode respectively from the operator viewpoint and the right hand side of mower 10.

The steps needed to configure mower 10 for field use are the reverse of those just discussed in order to transition from the transport position to the stowed position of transport arrangement 22. The position of tongue 18 in the transport mode is at a small angle to the tracking of mower 10, as seen in FIG. 7, so as to position the hitch in the desired location for connection with the tractor.

Transport arrangement 22 is coupled to chassis 12 and more particularly to trail frame 38, which is part of chassis 12. The coupling of transport arrangement 22 is offset to the side of the centerline of mower 10. The folding mechanism of transport arrangement 22 is provided to allow at least portions of transport arrangement 22 to be stowed above and to the rear of the trail frame 38 during field operations. Upon placing the center pivot disc mower conditioner 10 (CP-DMC) in the full field left position, the mechanism of transport arrangement 22 rotates about a pivot axis 34 that is parallel to or substantially parallel to the trail frame 38 (or the axis of the field wheels). This action can deploy the left hand (as in transport position) wheel 30 to a position ahead of the header (ahead as in the field position) while still located above the trail frame 38. When this rotation has been completed, a secondary rotation takes place about axis 32; this action is a pivoting action, which is above, and perpendicular to the trail frame 38 and the field wheel axis. This action rotates wheels 28 and 30 from their position above trail frame 38 to a position below trail frame 38 and in contact with the ground.

When this action is complete, the trail frame/header is then rotated to a position essentially in-line with tongue 18, thus allowing a narrow transport for public roads. The steps to transition from field operation to lateral transport operation are thus: 1. Fully lift chassis 12 to the non-mowing position by extending the field wheels 11A, 11B of field suspension system 20 by the lift cylinders 13A, 13B; 2. Rotate chassis 12 to the full field left position; 3. Extend the primary lateral transport cylinder 25 to rotate suspension element 26 along with wheel 30 from a position above and behind the trail frame 38 to a position above and ahead of the trail frame 38; 4. Extend the secondary lateral transport cylinder 27 to rotate suspension elements 24 and 26 with wheels 28 and 30 down below the trail frame 38, with wheel 28 being behind the header/trail frame 38 and wheel 30 being in front of the header/trail frame 38; 5. Initiate the system to complete the rotation of chassis 12 to the full lateral transport position and retract the lift cylinders 13A, 13B to raise the field wheels 11A, 11B. The steps to transition from lateral transport to field operation are then to reverse the actions starting with step 5 and working backward to step 1.

Header unit 42 is carried by suspension system 20. The tongue 18 arrangement is coupled to suspension system 20, with the tongue 18 arrangement being pivotal about an axis 50 relative to header unit 42 and suspension system 20. The retaining system 40 is configured to releasably couple the tongue 18 arrangement to header unit 42 and/or suspension system 20 to thereby retain header unit 42 in an elevated position. As can be seen in FIG. 1, hook 44 has a U-shaped opening, which is positioned in an offset fashion relative to tongue 18, and the U-shaped opening is open in a generally horizontal direction. The U-shaped opening is configured to have a generally reduced throat toward the bottom of the U-shape, in order to capture, then retain, retaining pin 46.

The subject disclosure includes a tongue-mounted hook 44 extending down toward header 42. Hook 42 has a corresponding retaining pin 46 or shaft 46 mounted on the top of header 42. When header 42/trail frame 38 are rotated to the full lateral transport position, where header 42 and trail frame 38 are basically parallel to tongue 18, then hook 44, hanging down from tongue 18, and shaft 46 extending up from header 42 engage. When the field wheels 11A, 11B are lifted by lift cylinders 13A, 13B to provide ground clearance, the engagement of hook 44 with shaft 46 does not allow header 42 to lower. However, the coupling of the header lift arms to the wheel arms allows the field wheels 11A, 11B to be lifted up. Any system can be used to actuate the lateral transport rotations, which engage and disengage hook 44 and shaft 46, with hydraulic cylinders being assumed, but the actions can be accomplished with any arrangement of cylinders, actuators, linear motors, rotational motors, to name a few.

Advantages of the subject disclosure include that retaining system 40 is completely position-based and passive. There are no pins or clasps that must be activated/actuated in order for the engagement to take place. Header 42 must only be lifted with the field wheels 11A, 11B during the rotation, as the hydraulic system undertakes, in order for hook 44 to engage with shaft 46.

While this disclosure has been described with respect to at least one embodiment, the subject disclosure can be further modified within the spirit and scope of this disclosure. This application is therefore intended to cover any variations, uses, or adaptations of the disclosure using its general principles. Further, this application is intended to cover such departures from the subject disclosure as come within known or customary practice in the art to which this disclosure pertains and which fall within the limits of the appended claims.

What is claimed is:
1. An agricultural mower comprising:
a chassis;
a pair of wheels coupled to the chassis;
a header unit coupled to the chassis, the header unit being vertically moveable by at least one actuator relative to the chassis between a field position, in which the pair of wheels contact a ground surface to support the header unit, and to an elevated position;
a tongue arrangement coupled to the chassis, the tongue arrangement being pivotal by an actuator about a generally vertical axis relative to the header unit and the chassis, the tongue arrangement carrying a first retaining element along a path about the vertical axis; and
a second retaining element connected to the header unit, wherein the at least one actuator is configured to move the header unit vertically to place the second retaining element in the path of the first retaining element to allow the first retaining element to capture the second retaining element as the tongue arrangement pivots from a field mode to a transport mode to thereby retain the header unit in the elevated position.

2. The agricultural mower of claim 1, wherein the second retaining element frees from the first retaining element as the tongue arrangement pivots from the transport mode to the field mode.

3. The agricultural mower of claim 2, wherein the first retaining element is a hook and the second retaining element is a receiving pin.

4. The agricultural mower of claim 3, wherein the hook is configured to engage the receiving pin to retain the header unit in the elevated position without a use of hydraulic actuators while the tongue arrangement is in the transport mode.

5. The agricultural mower of claim 3, wherein the hook is offset to a side of the tongue.

6. The agricultural mower of claim 5, wherein the hook has a U-shaped opening open in a generally horizontal direction.

7. An agricultural mower, comprising:
a chassis;
a pair of wheels coupled to the chassis;
a header unit coupled to the chassis, the header unit being vertically moveable by at least one actuator relative to the chassis between a field position, in which the pair of wheels contact a ground surface to support the header unit, and an elevated position;
a tongue arrangement coupled to the chassis, the tongue arrangement being pivotal by an actuator about a generally vertical axis relative to the header unit and the chassis, the tongue arrangement carrying a first retaining element along a path about the vertical axis; and
a second retaining element connected to the header unit, the second retaining element being in the path of the first retaining element only when the header unit is in the elevated position to allow the first retaining element to capture the second retaining element as the tongue arrangement pivots from a field mode to a transport mode to thereby retain the header unit in the elevated position,
wherein the at least one actuator is configured to move the header unit vertically to place the second retaining element in the path of the first retaining element.

8. The agricultural mower of claim 7, wherein the second retaining element frees from the first retaining element as the tongue arrangement pivots from the transport mode to the field mode.

9. The agricultural mower of claim 8, wherein the first retaining element is a hook and the second retaining element is a receiving pin.

10. The agricultural mower of claim 9, wherein the hook is configured to engage the receiving pin to retain the header unit in the elevated position without a use of hydraulic actuators while the tongue arrangement is in the transport mode.

11. The agricultural mower of claim 9, wherein the hook is offset to a side of the tongue.

12. The agricultural mower of claim 11, wherein the hook has a U-shaped opening open in a generally horizontal direction.

13. The agricultural mower of claim 12, wherein the U-shaped opening diminishes in breadth towards a bottom of the U-shaped opening.

14. An agricultural mower comprising:
a chassis;
a pair of field wheels coupled to the chassis;
a transport arrangement coupled to the chassis, the transport arrangement comprising a pair of suspension elements and a pair of transport wheels connected to respective ones of the pair of suspension elements, the pair of transport wheels movable by the at least one transport actuator between a first position in which they are not in contact with a ground surface and a second position in which they are in contact with the ground surface;
a header unit coupled to the chassis, the header unit being vertically moveable by at least one lift actuator relative to the chassis between a field position, in which the pair of field wheels contact the ground surface to support the header unit, and an elevated position;
a tongue arrangement coupled to the chassis, the tongue arrangement being pivotal by an actuator about a generally vertical axis relative to the header unit and the chassis, the tongue arrangement carrying a first retaining element along a path about the vertical axis; and
a second retaining element connected to the header unit, wherein the at least one lift actuator is configured to move the header unit vertically to place the second retaining element in the path of the first retaining element to allow the first retaining element to capture the second retaining element as the tongue arrangement pivots from a field mode to a transport mode to thereby retain the header unit in the elevated position, and
wherein the at least one lift actuator is configured to contract after the first retaining element has captured the second retaining element and while the pair of transport wheel are in the second position to raise the pair of field wheels off the ground surface.

15. The agricultural mower of claim 14, wherein the second retaining element frees from the first retaining element as the tongue arrangement pivots from the transport mode to the field mode.

16. The agricultural mower of claim 15, wherein the first retaining element is a hook and the second retaining element is a receiving pin.

17. The agricultural mower of claim 16, wherein the hook is configured to engage the receiving pin to retain the header unit in the elevated position without a use of hydraulic actuators while the tongue arrangement is in the transport mode.

18. The agricultural mower of claim 16, wherein the hook is offset to a side of the tongue.

19. The agricultural mower of claim 18, wherein the hook has a U-shaped opening open in a generally horizontal direction.

* * * * *